(12) United States Patent
Tanaka

(10) Patent No.: US 10,939,198 B2
(45) Date of Patent: Mar. 2, 2021

(54) NOISE ELIMINATING DEVICE, ECHO CANCELLING DEVICE, AND ABNORMAL SOUND DETECTING DEVICE

(71) Applicant: Mitsubishi Electric Corporation, Tokyo (JP)

(72) Inventor: Nobuaki Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/098,709

(22) PCT Filed: Jul. 21, 2016

(86) PCT No.: PCT/JP2016/071373
§ 371 (c)(1),
(2) Date: Nov. 2, 2018

(87) PCT Pub. No.: WO2018/016044
PCT Pub. Date: Jan. 25, 2018

(65) Prior Publication Data
US 2019/0149912 A1 May 16, 2019

(51) Int. Cl.
*H04R 3/00* (2006.01)
*H04R 1/40* (2006.01)
(Continued)

(52) U.S. Cl.
CPC .......... *H04R 1/406* (2013.01); *G10L 21/0216* (2013.01); *H04M 9/08* (2013.01);
(Continued)

(58) Field of Classification Search
CPC . H04R 1/406; H04R 1/40; H04R 3/00; H04R 3/02; H04M 9/08; H04M 9/082; H04M 9/085; G10L 21/0216
See application file for complete search history.

(56) References Cited

U.S. PATENT DOCUMENTS

2002/0138254 A1 9/2002 Isaka et al.
2003/0177007 A1 9/2003 Kanazawa et al.
(Continued)

FOREIGN PATENT DOCUMENTS

JP 11-52977 A 2/1999
JP 2003-271191 A 9/2003
(Continued)

OTHER PUBLICATIONS

Tanaka et al., "Development of Zonal Beamformer and its Application to Robot Audition," Proc. EUSIPCO2010, Aug. 2010, pp. 1529-1533.
(Continued)

*Primary Examiner* — Ping Lee
(74) *Attorney, Agent, or Firm* — Birch, Stewart, Kolasch & Birch, LLP

(57) ABSTRACT

A noise eliminating device including: an acoustic sensor array including a first acoustic sensor at a vertex forming a vertex angle of an isosceles triangle, and second and third acoustic sensors at the other vertexes of the isosceles triangle, the first sensor being arranged on a bisector between two boundaries between a direction range in which a target sound source can exist and a direction range in which a noise source can exist; and the second and third sensors being arranged so that the boundaries coincide with a direction of a perpendicular bisector of a line segment connecting the first and second sensors, and a direction of a perpendicular bisector of a line segment connecting the first and third sensors; and a processor to use signals output from the sensors to output a signal obtained by enhancing sound from the target sound source and eliminating noise from the noise source.

6 Claims, 8 Drawing Sheets

(51) Int. Cl.
*H04R 3/02* (2006.01)
*H04M 9/08* (2006.01)
*G10L 21/0216* (2013.01)

(52) U.S. Cl.
CPC ........... *H04M 9/082* (2013.01); *H04M 9/085* (2013.01); *H04R 1/40* (2013.01); *H04R 3/00* (2013.01); *H04R 3/02* (2013.01)

(56) References Cited

U.S. PATENT DOCUMENTS

| | | | |
|---|---|---|---|
| 2010/0226210 A1* | 9/2010 | Kordis | G01S 5/0027 367/127 |
| 2011/0150067 A1 | 6/2011 | Takada | |
| 2015/0139426 A1* | 5/2015 | Tammi | H04R 3/005 381/17 |
| 2015/0163577 A1* | 6/2015 | Benesty | H04R 3/04 381/92 |

FOREIGN PATENT DOCUMENTS

| | | |
|---|---|---|
| JP | 2006-3697 A | 1/2006 |
| JP | 2006-349723 A | 12/2006 |
| JP | 2008-76246 A | 4/2008 |
| JP | 2010-271073 A | 12/2010 |
| JP | 2011-130170 A | 6/2011 |

OTHER PUBLICATIONS

Tanaka et al., "Development of zone-enhanced beamformers," J. Acoustic. Soc, Sep. 2009, pp. 153-154.

Tanaka et al., "Spatial filter calibration based on minimization of modified LSD," J. Acoustic. Soc, Sep. 2011, pp. 33-36.

Tanaka et al., "Spatial filter calibration based on minimization of modified LSD," Proc. Interspeech 2011, Aug. 2011, pp. 1761-1764.

* cited by examiner

NOISE ELIMINATING DEVICE, ECHO CANCELLING DEVICE, AND ABNORMAL SOUND DETECTING DEVICE

TECHNICAL FIELD

The present invention relates to a noise eliminating device that enhances only sound coming from a target direction of the sound coming from multiple sound sources located at different positions, and eliminates other sound.

BACKGROUND ART

A noise eliminating device eliminates noise from sound data recorded using an acoustic sensor, such as a microphone, thereby making target sound (desired sound) easier to hear. With this device, it is possible, for example, to clarify voice that is hard to hear due to noise generated from equipment, such as an air conditioner, or to extract only utterances of a target speaker when multiple speakers speak simultaneously.

Such a technique can not only make voice easier to hear for people, but also improve robustness against noise in a voice recognition system or the like. Besides clarifying human utterances, it can also be used for purposes, such as preventing deterioration in detection accuracy due to ambient noise in a device monitoring system that automatically detects whether the operating sound of a device includes abnormal sound.

As a method of eliminating noise, there is a method that forms an acoustic sensor array with multiple acoustic sensors and performs signal processing by software on observed signals obtained from the respective acoustic sensors, thereby forming directivity to a target sound source. Since this method can form sharp directivity using inexpensive acoustic sensors, such as omnidirectional microphones, it has the advantage of reducing hardware cost. Also, since it can dynamically change the formed directivity by software, it can cope with a situation in which a sound source moves.

In the above noise eliminating method, it is known that the noise elimination performance depends on the arrangement of the acoustic sensors constituting the acoustic sensor array. Regarding this, Non Patent Literatures 1 and 2 experimentally show that noise elimination performance depends on the positional relationship between acoustic sensors, a target sound source, and a noise source. However, Non Patent Literatures 1 and 2 refer to no specific positional relationship between acoustic sensors and sound sources that provides high noise elimination performance.

Non Patent Literatures 3 and 4 disclose arrangements of acoustic sensors for noise elimination. Noise eliminating methods disclosed in Non Patent Literatures 3 and 4 perform noise elimination using a time difference between observed signals obtained from multiple acoustic sensors, thus allowing intervals between the acoustic sensors to be reduced. However, they are silent as to whether the acoustic sensor arrangements disclosed in these literatures exhibit higher noise elimination performance than other acoustic sensor arrangements.

Patent Literature 1 discloses a specific positional relationship between acoustic sensors, a target sound source, and a noise source for performing noise elimination using a sound volume difference between the acoustic sensors.

Patent Literature 1: Japanese Patent Application Publication No. 2006-349723

Non Patent Literature 1: Nobuaki Tanaka, Tetsuji Ogawa, Tetsunori Kobayashi, "Spatial filter calibration based on minimization of modified LSD," Proc. Interspeech 2011, pp. 1761-1764, August 2011.

Non Patent Literature 2: Nobuaki Tanaka, Tetsuji Ogawa, Tetsunori Kobayashi, "Spatial filter calibration based on minimization of Modified LSD," Lecture Paper Collection of the Acoustical Society of Japan, pp. 33-36, September 2011.

Non Patent Literature 3: Nobuaki Tanaka, Kosuke Hosoya, Tetsuji Ogawa, Tetsunori Kobayashi, "Development of zone enhancement beamformer," Lecture Paper Collection of the Acoustical Society of Japan, pp. 153-154, September 2009.

Non Patent Literature 4: Nobuaki Tanaka, Tetsuji Ogawa, Kenzo Akagiri and Tetsunori Kobayashi, "Development of zonal beamformer and its application to robot audition," Proc. EUSIPCO 2010, pp. 1529-1533, August 2010.

SUMMARY OF INVENTION

Technical Problem

However, Patent Literature 1 has a problem in that for the sake of performing noise elimination using the sound volume difference between the acoustic sensors, a reasonably large interval is required between the acoustic sensors, which enlarges the device.

To solve this problem, the present invention is intended to achieve high noise elimination performance with a small interval between acoustic sensors.

Solution to Problem

A noise eliminating device according to the present invention includes: an acoustic sensor array including two or more acoustic sensors, the acoustic sensors being arranged so that a direction of a perpendicular bisector of a line segment connecting two adjacent acoustic sensors of the two or more acoustic sensors coincides with a direction from which noise comes; and a noise elimination processing means for using signals output from the acoustic sensors to output a signal obtained by enhancing sound from a target direction.

Advantageous Effects of Invention

A noise eliminating device of the present invention accurately estimates a direction from which noise comes, with an acoustic sensor array including two or more acoustic sensors arranged so that a direction of a perpendicular bisector of a line segment connecting two adjacent acoustic sensors of the two or more acoustic sensors coincides with the direction from which the noise comes, and thus can provide high noise elimination performance with a small interval between the acoustic sensors.

DESCRIPTION OF EMBODIMENTS

Embodiments of a noise eliminating device, an echo cancelling device, an abnormal sound detecting device, and a noise eliminating method according to the present invention will now be described in detail with reference to the drawings. The present invention is not limited by the embodiments.

First Embodiment

Figure 1:
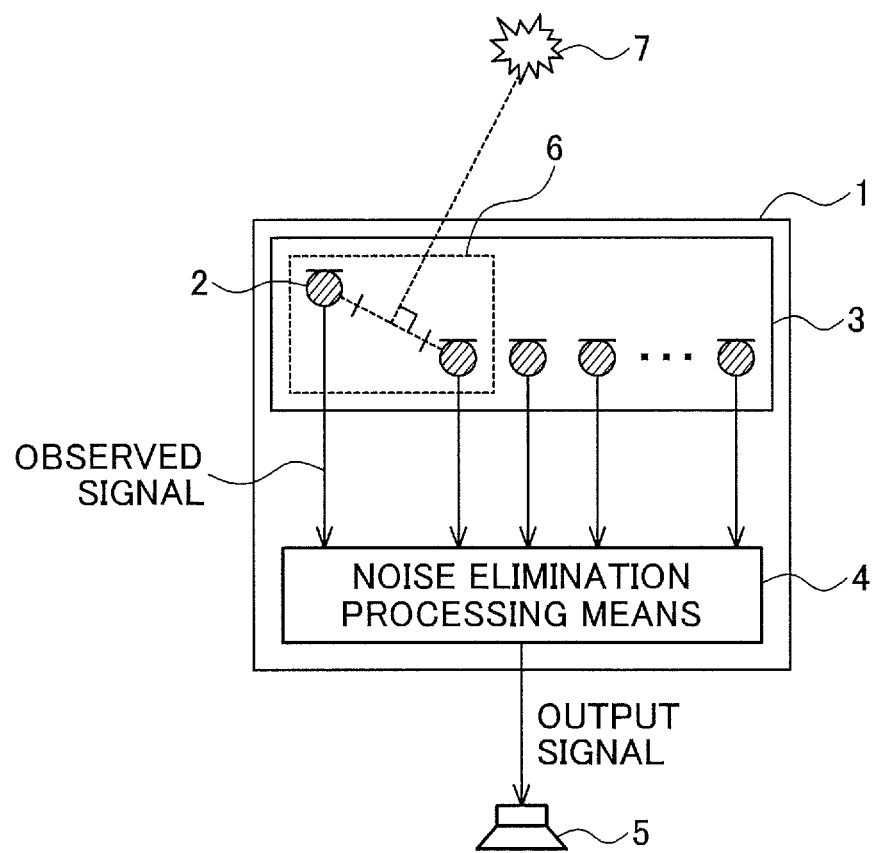
FIG. 1 is a configuration diagram of a noise eliminating device 1 of a first embodiment of the present invention.

FIG. 1 is a configuration diagram of a noise eliminating device 1 according to a first embodiment of the present invention.

In this embodiment, description will be made by taking microphones as a specific example of acoustic sensors; an acoustic sensor pair will be described as a microphone pair; an acoustic sensor array will be described as a microphone array. However, acoustic sensors in the present invention are not limited to microphones, and may be ultrasound sensors, for example.

The noise eliminating device 1 includes a microphone array 3 including two or more microphones 2, and a noise elimination processing means (or noise elimination processor) 4. Signals (observed signals) of sounds observed by the microphones 2 of the noise eliminating device 1 are output to the noise elimination processing means 4. The noise elimination processing means 4 then outputs an output signal obtained by enhancing only sound from a direction from which a target sound comes in the observed signals and eliminating noise in the observed signals, to a speaker 5 connected to the noise eliminating device 1.

An arrangement of the microphones 2 will now be described.

In FIG. 1, when pairs of adjacent ones of the microphones 2 are referred to as microphone pairs 6, the microphones 2 are arranged so that a direction of a perpendicular bisector of a line segment connecting at least one microphone pair 6 coincides with a noise source 7 (coincides with a direction from which noise comes). The observed signals are output from the microphones 2 to the noise elimination processing means 4. The positional relationship of the noise source 7 with the microphones 2 is assumed to be known.

Here, description will be made on the positional relationship between the microphones 2 and the noise source 7 that maximizes the noise elimination performance when noise elimination is performed using one microphone pair 6.

Figure 2:
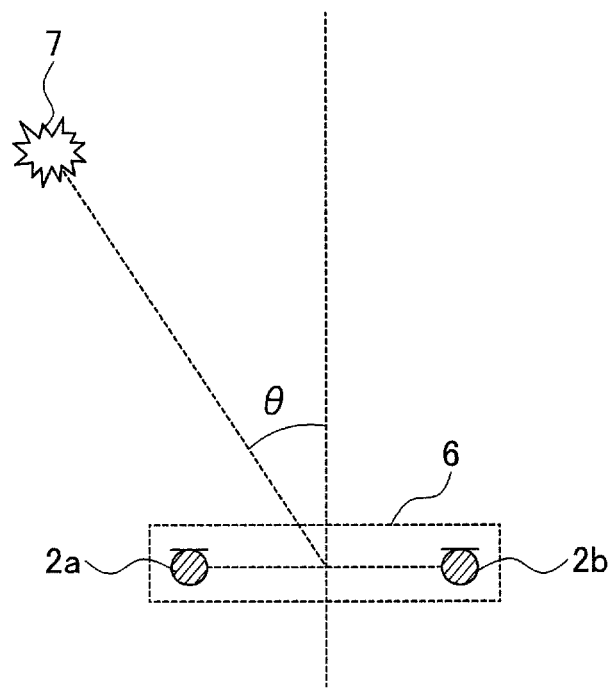
FIG. 2 is an explanatory diagram regarding an arrangement of microphones 2 of the first embodiment of the present invention.

FIG. 2 is an explanatory diagram of an arrangement of the microphones 2 in the first embodiment of the present invention.

As illustrated in FIG. 2, the direction (in radians) from which sound from the sound source comes is denoted by θ with a direction of a perpendicular bisector of a line segment connecting the microphone pair 6 as a reference.

Figure 3:
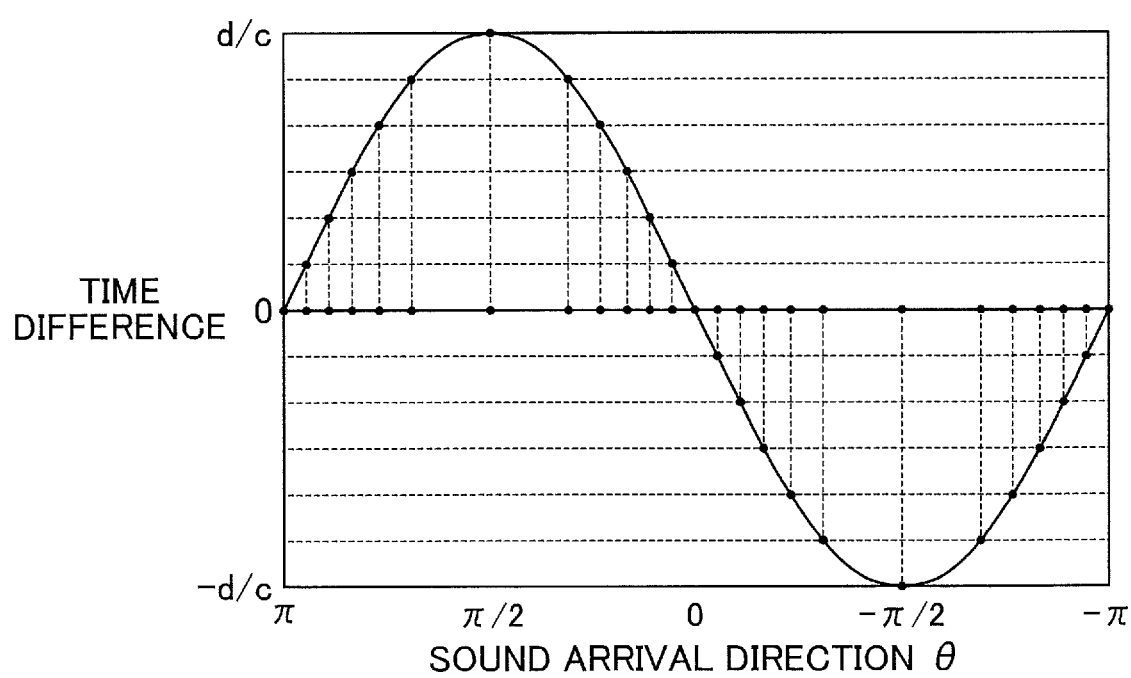
FIG. 3 is a relationship diagram between an arrival direction θ of sound observed by a microphone pair 6 and a time difference, in the first embodiment of the present invention.

FIG. 3 is a relationship diagram between the arrival direction θ of sound observed by the microphone pair 6 of the first embodiment of the present invention and a time difference.

In FIG. 3, gridlines are drawn at regular intervals along a vertical axis that represents the time difference, and dots are placed at sound arrival directions θ corresponding to the values of the time difference at the gridlines. The sound arrival directions θ at the positions of these dots are unequally spaced as illustrated in FIG. 3.

Figure 4:
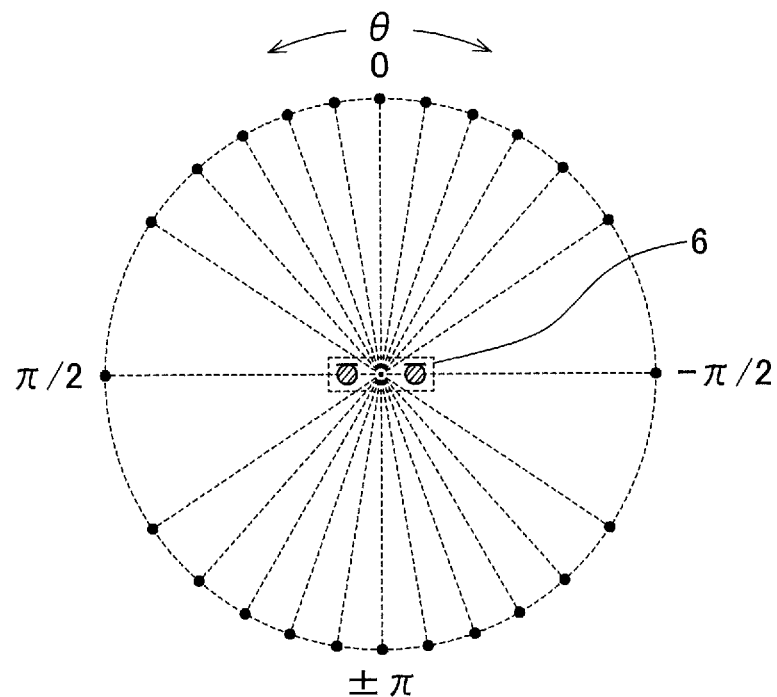
FIG. 4 is a plot obtained by plotting the sound arrival directions θ illustrated in FIG. 3 on a circle centered at the microphone pair 6, in the first embodiment of the present invention.

FIG. 4 is a plot obtained by plotting the sound arrival directions θ illustrated in FIG. 3 on a circle centered at the microphone array 3 of the first embodiment of the present invention.

FIG. 4 shows that for sound arrival directions θ around 0, the unequally spaced dots are densely distributed, and for sound arrival directions θ around ±π/2, the unequally spaced dots are sparsely distributed. When an observed time difference deviates by an amount corresponding to the gridline interval in FIG. 3 from the actual time difference due to, for example, the effect of noise, one of the two dots next to the dot in FIG. 4 corresponding to the actual sound arrival direction is calculated as an observed value of the sound arrival direction. In a direction range in FIG. 4 in which the dots are densely distributed, even when a deviation occurs in the time difference, the observed value of the sound arrival direction does not greatly deviate.

On the other hand, it can be seen that in a direction range in which the dots are sparsely distributed, a slight deviation of the time difference causes the observed value of the sound arrival direction to greatly deviate. Thus, when the sound arrival direction is observed using the microphone pair, it can be most accurately observed when the angle of the arrival direction of the noise is close to 0, that is, when the noise source 7 exists in the direction of the perpendicular bisector of the line segment connecting the microphone pair.

In noise elimination, the noise source 7 (the arrival direction of the noise), which is a component to be eliminated, needs to be accurately observed. Thus, from the above viewpoint, it can be seen that the noise elimination performance is maximized when the noise source 7 exists in the direction of the perpendicular bisector of the line segment connecting the microphone pair 6. The requirement that the direction of the perpendicular bisector of the line segment connecting the microphone pair 6 coincide with the arrival direction of the noise only requires that the arrival direction of the noise be closer to the direction of the perpendicular bisector of the line segment connecting the microphone pair 6 than the arrival direction of the target sound. When the microphone pair 6 is arranged so that the direction of the perpendicular bisector of the line segment connecting the microphone pair 6 coincides with the arrival direction of the noise, the noise to be eliminated can be observed more accurately than when the microphone pair 6 is arranged so that the arrival direction of the target sound is closer to the direction of the perpendicular bisector of the line segment connecting the microphone pair 6 than the arrival direction of the noise.

Figure 5:
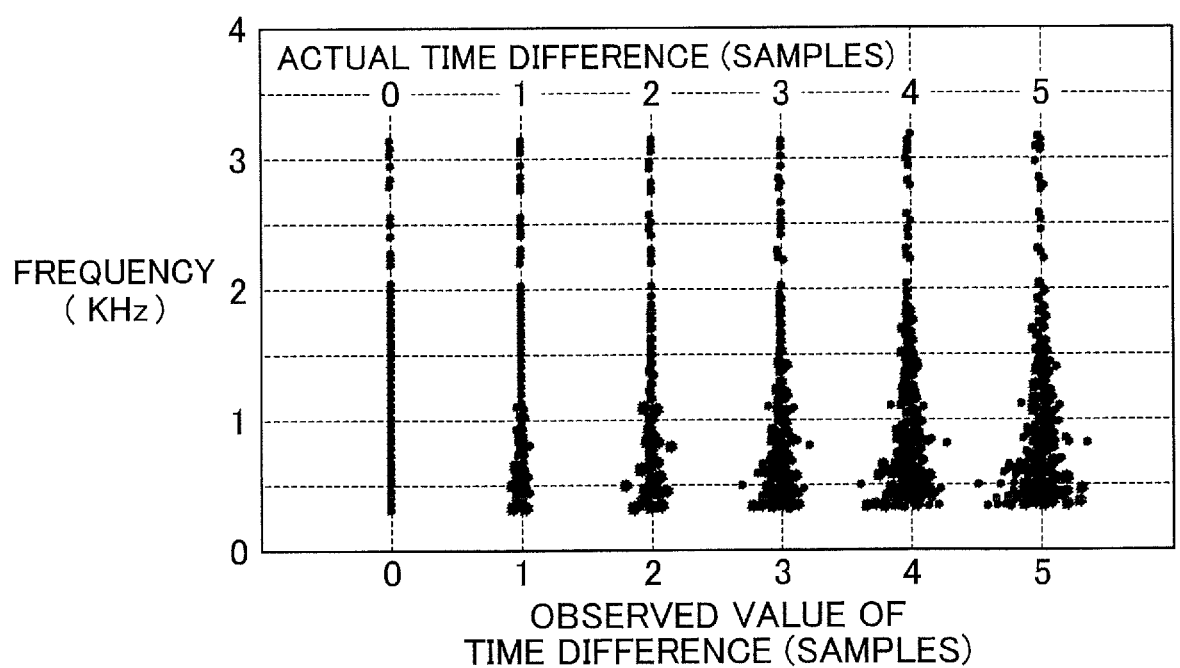
FIG. 5 is a plot obtained by plotting, with respect to two sound signals with a time difference therebetween, observed values of the time difference for each discrete frequency.

FIG. 5 is a plot obtained by plotting, with respect to two sound signals with a time difference therebetween, observed values of the time difference for each discrete frequency.

There is another reason why the above-described positional relationship between the microphone pair 6 and the noise source 7 is advantageous for noise elimination. FIG. 5 shows that as the time difference between the two sound signals increases, the variance of the observed time difference increases, which prevents the time difference from being accurately obtained. This is because when short-time discrete Fourier transform is performed, boundaries between short-time frames for the two signals do not coincide. Thus, for the microphone pair 6 constituted by the two microphones 2, when the time difference between sounds reaching the two microphones 2 is close to 0, that is, when the arrival direction of the noise coincides with the direction of the perpendicular bisector of the line segment connecting the adjacent microphones 2, the time difference can be observed most accurately.

As described above, from the two viewpoints that even when a time difference occurs between the sounds, the deviation of the observed value between the two dots is small, and that the variance of the time difference between the sound signals is small, by arranging the microphones 2 so that the direction of the perpendicular bisector of the line segment connecting the adjacent microphones 2 coincides with the noise source 7, it is possible to maximize the noise elimination performance with a small interval between the acoustic sensors.

For example, in a case where the microphones 2 are mounted on a vehicle and observes voice of a passenger, when the direction of the noise from the engine, which can be the noise source 7, is known and the engine noise is eliminated, the microphone pair 6 is arranged so that the direction of the perpendicular bisector of the line segment connecting the adjacent microphones 2 coincides with the direction of the engine, which is the noise source 7. By arranging the microphones 2 in this manner, it is possible to maximize the noise elimination performance and enhance voice of the passenger, with a small interval between the microphones 2.

Returning to the description of the configuration of FIG. 1, the noise elimination processing means 4 will now be described.

The noise elimination processing means 4 outputs an output signal obtained from the observed signals input from the microphones 2 by enhancing sound from the arrival direction of the target sound and eliminating the noise, to the speaker 5 connected to the noise eliminating device 1.

In general, to enhance sound arriving from a particular direction by using the microphone array 3, the sound arrival direction is first observed for each time-frequency pair on the basis of time differences between the observed signals obtained from the multiple microphones 2. Then, a method of applying a filter to the observed signal of an observed sound is used, the filter being configured to enhance time-frequency components constituting the sound arriving from the target direction in the observed signal and eliminate the other components in the observed signal.

Figure 6:
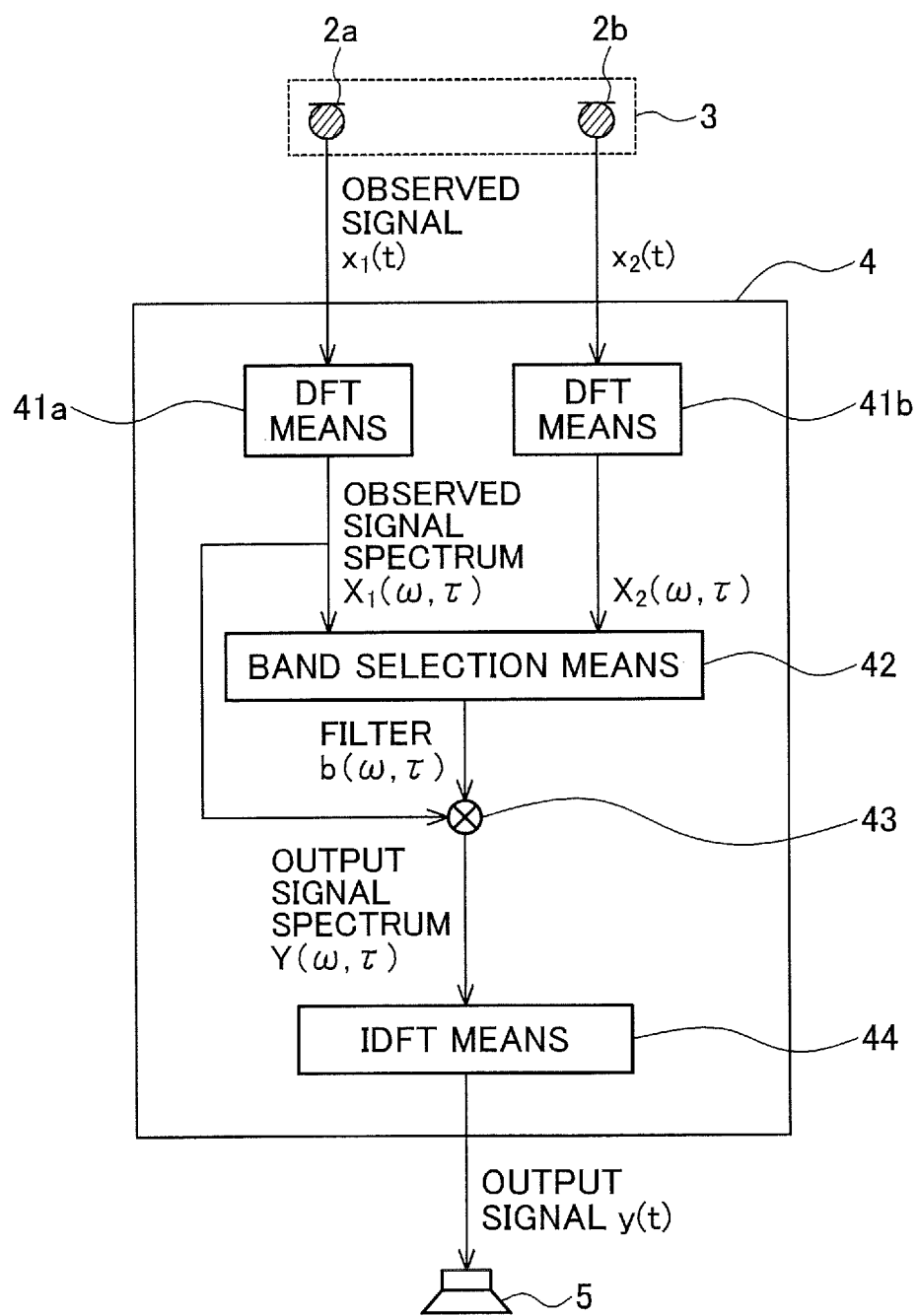
FIG. 6 is a configuration diagram of a noise elimination processing means 4 of the first embodiment of the present invention.

FIG. 6 is a configuration diagram of the noise elimination processing means 4 of the first embodiment of the present invention.

The noise elimination processing means 4 includes discrete Fourier transform (DFT) means (or discrete Fourier transformers) 41, a band selection means (or band selector) 42, a multiplication means (or multiplier) 43, and an inverse discrete Fourier transform (IDFT) means (or inverse discrete Fourier transformer) 44. Although the noise elimination processing means 4 is described here as having the configuration illustrated in FIG. 6, it need not necessarily have the configuration as in FIG. 6 and may have other configurations.

To simplify description, the following describes a case where the microphone array 3 is constituted by two microphones 2. It is easy to extend it to configurations having three or more microphones 2, and the present invention also includes cases where the microphone array 3 is constituted by three or more microphones 2. It is assumed that the two microphones 2 constituting the microphone array 3 are microphones 2a and 2b, and these two microphones 2 constitute a microphone pair 6.

The hardware configuration of the noise eliminating device 1 will now be described.

Figure 7:
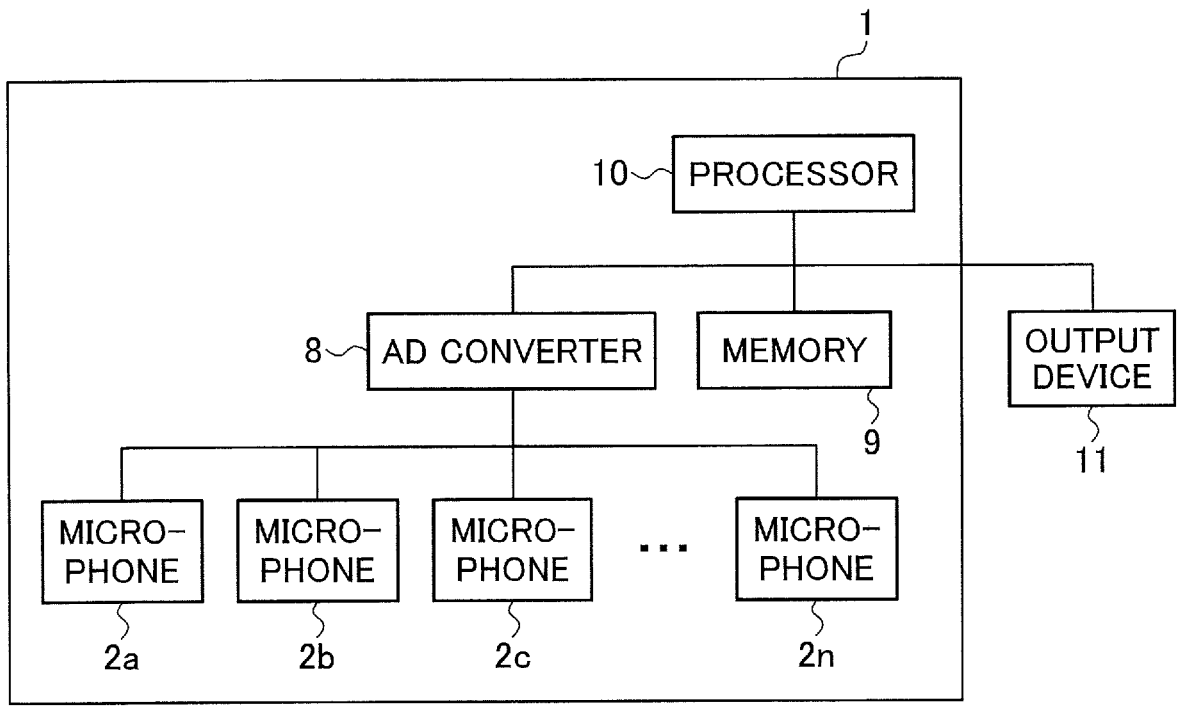
FIG. 7 is a hardware configuration diagram of the noise eliminating device 1 of the first embodiment of the present invention.

FIG. 7 is a hardware configuration diagram of the noise eliminating device 1 of the first embodiment of the present invention.

The noise eliminating device 1 includes microphones 2 that collect sound; an AD converter 8 that converts output signals of the microphones 2 to digital signals; a memory 9 that stores programs of the DFT means 41, band selection means 42, multiplication means 43, and IDFT means 44 of the noise elimination processing means 4; and a processor 10 that reads the programs of the respective means of the noise elimination processing means 4 from the memory 9 and executes them. An output signal resulting from processing by the processor 10 is output to an output device 11 (for example, the speaker 5 in FIG. 1). FIG. 7 illustrates an example in which the microphone array 3 includes n microphones 2.

Figure 8:
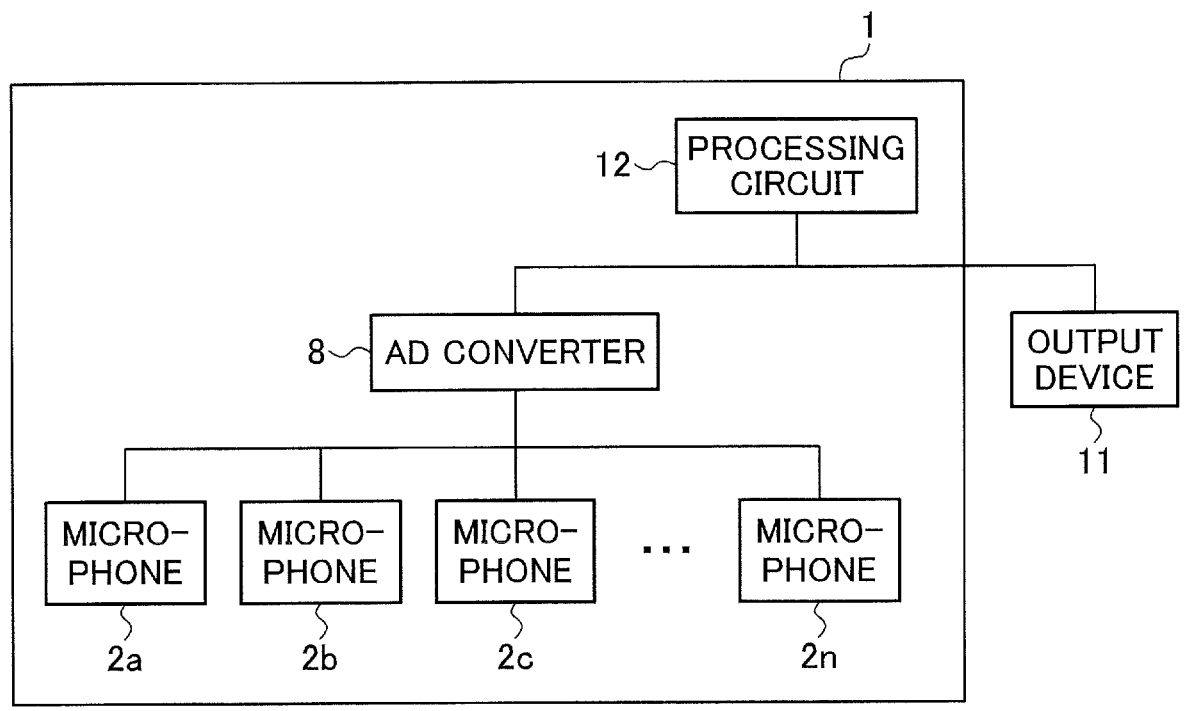
FIG. 8 is another hardware configuration diagram of the noise eliminating device 1 of the first embodiment of the present invention.

FIG. 8 is another hardware configuration diagram of the noise eliminating device 1 of the first embodiment of the present invention.

FIG. 8 illustrates a configuration in which the signal processing of the noise elimination processing means 4 is implemented by hardware. The noise eliminating device 1 includes microphones 2 that collect sound; an AD converter 8 that converts output signals of the microphones 2 to digital signals; and a processing circuit 12 that stores programs of the DFT means 41, band selection means 42, multiplication means 43, and IDFT means 44 of the noise elimination processing means 4, and reads and executes the stored programs. An output signal resulting from processing by the processing circuit 12 is output to an output device 11 (for example, the speaker 5 in FIG. 1). FIG. 8 illustrates an example in which the microphone array 3 includes n microphones 2.

The operation of the noise eliminating device 1 will now be described with reference to FIG. 6.

Sounds collected by the microphones 2a and 2b in the noise eliminating device 1 are converted to digital form by the AD converter 8 illustrated in FIG. 7 or 8, and input into the DFT means 41a and 41b as time-domain observed signals, respectively. Then, they are converted to frequency-domain observed signal spectra by the DFT means 41a and 41b, and output to the band selection means 42. The band selection means 42 generates a filter configured to enhance only time-frequency components constituting the target sound in the observed signals on the basis of the time differences. Then, the multiplication means 43 multiplies an observed signal spectrum obtained from the filter and the observed signal spectrum obtained from the DFT means 41*a* or DFT means 41*b*, thereby generating an output signal spectrum. Then, the output signal spectrum is input into the IDFT means 44 and converted to a time-domain output signal through inverse discrete Fourier transform, and the converted output signal is output to the speaker 5.

Hereinafter, the operation of the noise eliminating device 1 will be described in detail.

The noise eliminating device 1 first arranges the microphones 2 so that the noise source 7 exists in the direction of the perpendicular bisector of the line segment connecting the microphones 2*a* and 2*b* as illustrated in FIG. 2 (a noise eliminating step). Sounds collected by the microphones 2 thus arranged have the noise observed most accurately; sounds collected by the microphones 2*a* and 2*b* are input into the DFT means 41*a* and 41*b* of the noise elimination processing means 4 illustrated in FIG. 6 as observed signals, respectively.

In the DFT means 41*a* and 41*b*, the time-domain observed signals obtained at time t from the microphones 2*a* and 2*b* are denoted as $x_1(t)$ and $x_2(t)$, respectively. The DFT means 41*a* and 41*b* perform short-time discrete Fourier transform on the input observed signals $x_1(t)$ and $x_2(t)$, and output resultant frequency-domain observed signal spectra $X_1(\omega,\tau)$ and $X_2(\omega,\tau)$, where $\omega$ denotes a discrete frequency and $\tau$ denotes a short time frame.

Then, the band selection means 42 calculates the sound arrival direction for each discrete frequency on the basis of the observed signal spectra $X_1(\omega,\tau)$ and $X_2(\omega,\tau)$ input from the DFT means 41*a* and 41*b*. When it is assumed that the sound source is sufficiently far away from the microphone array 3, the sound arrival direction $\theta(\omega,\tau)$ can be calculated on the basis of the phase difference between $X_1(\omega,\tau)$ and $X_2(\omega,\tau)$ as in Equation 1:

$$\theta(\omega, \tau) = \arcsin\left\{\frac{c}{2\pi\omega d}\arg\left(\frac{X_2(\omega, \tau)}{X_1(\omega, \tau)}\right)\right\} \quad \text{Equation 1}$$

where c denotes the sound speed, d denotes the distance between the microphones, and arg denotes the argument of a complex number.

The sound arrival direction $\theta(\omega,\tau)$ calculated by Equation 1 is represented as the angle (in radians) that is defined as 0 at the direction perpendicular to the line segment connecting the microphone pair 6 constituted by the microphones 2*a* and 2*b* as illustrated in FIG. 2.

Then, on the basis of the sound arrival direction $\theta(\omega,\tau)$ for each discrete frequency, the band selection means 42 generates a filter $b(\omega,\tau)$ configured to leave only time-frequency components of sound arriving from the direction of the target sound, as in Equation 2, and outputs it to the multiplication means 43.

$$b(\omega, \tau) = \begin{cases} 1 & (\theta(\omega, \tau) \in \Theta) \\ 0 & (\text{otherwise}) \end{cases} \quad \text{Equation 2}$$

where $\Theta$ is a set of arrival directions of the target sound.

Equation 2 generates a filter configured to multiply, by 1 as a coefficient, the time-frequency components of sound arriving from the desired directions and multiply, by 0, the other sound components. This filter can enhance only the time-frequency components of the target sound included in the observed signals.

The multiplication means 43 multiplies the observed signal spectrum $X_1(\omega,\tau)$ of the microphone 2*a* by the filter $b(\omega,\tau)$ to generate an output signal spectrum $Y(\omega,\tau)$ with noise eliminated, and outputs it to the IDFT means 44.

Although here it is described that the observed signal spectrum $X_1(\omega,\tau)$ of the microphone 2*a* is multiplied by the filter $b(\omega,\tau)$, that of the microphone 2*b* or an arbitrary microphone 2 may be multiplied.

Then, the IDFT means 44 converts the input output signal spectrum $Y(\omega,\tau)$ to a time-domain output signal y(t) through inverse discrete Fourier transform, and outputs the converted output signal y(t) to the speaker 5 (a noise eliminating step). Thus, the speaker 5 outputs sound in which the noise has been maximally eliminated and the target sound has been enhanced.

Although it is described here as the speaker 5, it may be an earphone, a memory, a hard disk, or the like. When the output destination is a storage medium, such as a memory or a hard disk, digital data of the noise-eliminated sound is stored in the storage medium.

When the microphone array 3 is constituted by three or more microphones 2, it is possible to eliminate the noise more accurately by, for example, generating the filter using averages of sound arrival directions observed by multiple microphone pairs 6.

As above, by arranging the microphones 2 so that the direction of the perpendicular bisector of the line segment connecting at least one microphone pair 6 coincides with the noise source 7, the deviation of the observed value when a time difference occurs in the noise to be eliminated is reduced, the variance of the time difference between the observed signals with respect to the noise to be eliminated is reduced, estimation of the noise arrival direction based on the time difference can be performed with high accuracy, and thus it is possible to achieve high noise elimination performance. Thus, compared to other microphone arrangements, the noise can be eliminated accurately, which improves the clarity of the target sound.

Second Embodiment

The following describes an example in which the microphone array 3 described in the first embodiment is applied to an echo cancelling device 14 that outputs a signal subjected to echo cancellation processing based on a reference signal from a voice receiver 13 that receives voice (telephone voice) from a communication partner.

The echo cancelling device 14 described here is used, for example, in a hands-free telephone system to avoid a situation in which telephone voice received by the voice receiver 13 is reproduced by a speaker 15, and the telephone voice reproduced by the speaker 15 intrudes into telephone microphones (microphones 2) for a speaking person, so that the telephone voice is repeatedly reproduced like echo.

The echo cancelling device 14 observes telephone voice output from the speaker 15 and voice of a speaking person at a communication source, and outputs a signal obtained by performing, based on the reference signal from the voice receiver 13, echo cancellation processing on an output signal obtained by eliminating (noise-eliminating) the telephone voice as noise and enhancing the voice, which is the target sound, of the speaking person at the communication source.

Figure 9:
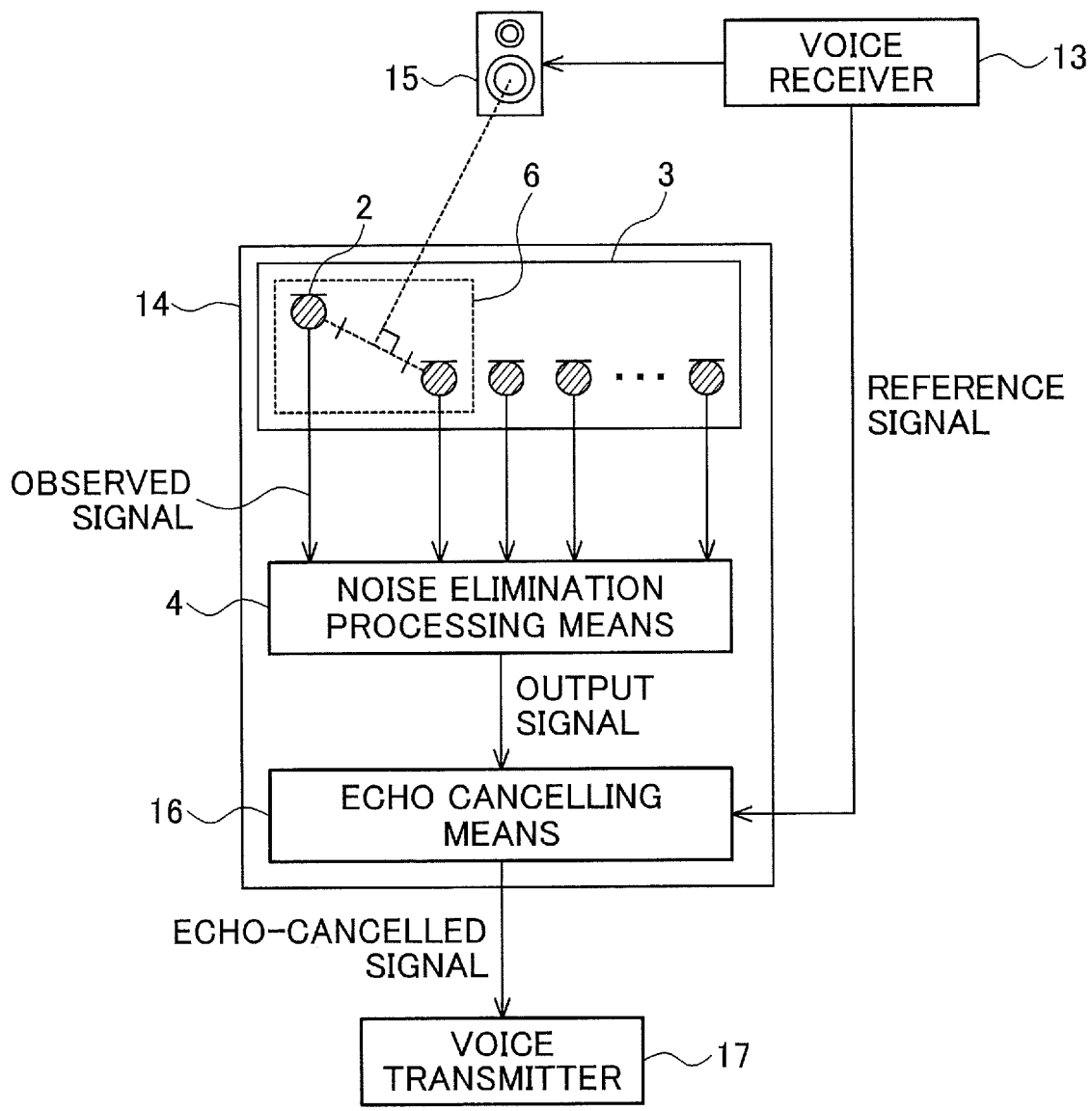
FIG. 9 is a configuration diagram of an echo cancelling device 14 of a second embodiment of the present invention.

FIG. 9 is a configuration diagram of the echo cancelling device 14 of a second embodiment of the present invention.

The echo cancelling device 14 includes a microphone array 3 and a noise elimination processing means 4 that are configured as described in the first embodiment, and an echo cancelling means (echo canceller) 16.

The microphone array 3 has microphones 2 arranged so that the direction of the perpendicular bisector of the line segment connecting at least one microphone pair 6 coincides with the speaker 15 as a noise source that outputs voice received by the voice receiver 13. Observed signals of sounds observed by the microphone array 3 are output to the noise elimination processing means 4.

The noise elimination processing means 4 is configured as described in the first embodiment, and outputs an output signal obtained from the observed signals input from the microphone array 3 by enhancing the target sound and eliminating the noise, to the echo cancelling means 16.

The echo cancelling means 16 cancels echo from the output signal input from the noise elimination processing means 4 on the basis of the reference signal from the voice receiver 13, and outputs the echo-cancelled voice signal to a voice transmitter 17 connected to the echo cancelling device 14 (an echo cancelling step).

The voice transmitter 17 transmits the echo-cancelled voice signal to the communication partner.

The echo cancelling device 14 eliminates sound from the speaker 15 as noise (echo) in the same manner as the noise eliminating device 1 of the first embodiment. At this time, in general, echo is not completely eliminated due to reverb or other disturbance factors. Thus, the echo cancelling means 16 cancels echo remaining in the output signal of the noise elimination processing means 4 using the reference signal obtained from the voice receiver 13. As a method of cancelling echo on the basis of the reference signal, the LMS algorithm and affine projection algorithm are known.

By arranging the microphones 2 so that the speaker 15, which is a noise source causing echo, is located in the direction of the perpendicular bisector of the line segment connecting the microphone pair 6 and inserting the high-performance noise elimination processing before the echo cancellation processing as described above, it is possible to achieve excellent echo cancellation performance and improve the clarity of the target sound, as compared to typical echo cancelling devices.

Third Embodiment

The following describes an abnormal sound detecting device 19 that constantly monitors operating sound of a monitoring target device 18, which is a device to be monitored, with microphones 2 arranged as described in the first embodiment, and automatically detects abnormal sound due to failure or malfunction of the device.

In constant monitoring based on operating sound of a device, there is a problem in that operating sound of neighboring another device or other sound acts as noise and deteriorates accuracy in detection of abnormal sound. Thus, by eliminating noise and enhancing operating sound of the monitoring target device 18 as the target sound in the same manner as in the first embodiment, it is possible to improve accuracy in detection of abnormal sound.

Figure 10:
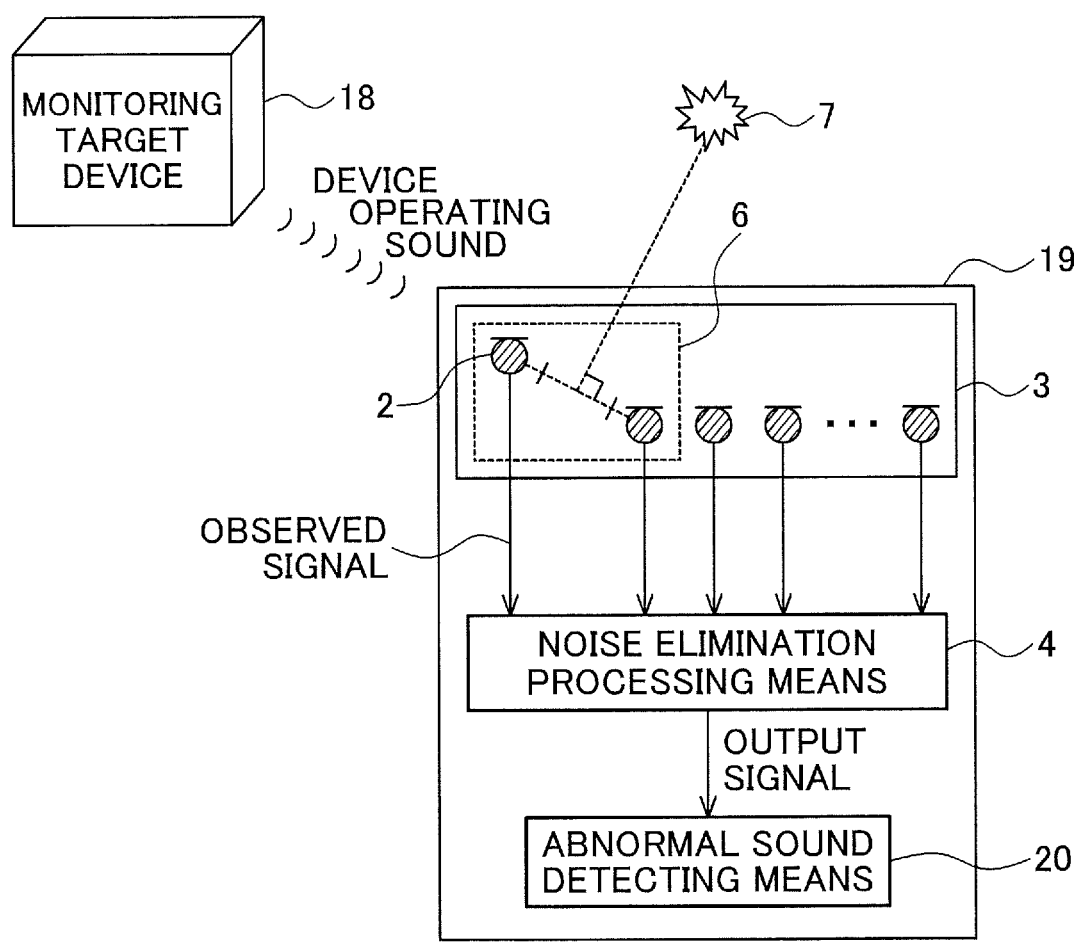
FIG. 10 is a configuration diagram of an abnormal sound detecting device 19 of a third embodiment of the present invention.

FIG. 10 is a configuration diagram of the abnormal sound detecting device 19 of a third embodiment of the present invention.

The abnormal sound detecting device 19 includes a microphone array 3 and a noise elimination processing means 4 that are configured as described in the first embodiment, and an abnormal sound detecting means (abnormal sound detector) 20.

The microphone array 3 has the microphones 2 arranged so that the direction of the perpendicular bisector of the line segment connecting at least one microphone pair 6 coincides with a noise source 7. Observed signals of sounds observed by the microphone array 3 are output to the noise elimination processing means 4. Here, the noise source 7 is, for example, a device other than the monitoring target device 18 that is known to act as the noise source 7, and the microphones 2 are arranged relative to the position of the noise source 7 as described above.

The noise elimination processing means 4 is configured as described in the first embodiment, and outputs an output signal obtained from the observed signals input from the microphone array 3 arranged as described in the first embodiment by enhancing sound arriving from the monitoring target device 18 as the target sound and eliminating the noise, to the abnormal sound detecting means 20.

The abnormal sound detecting means 20 detects abnormal sound of the monitoring target device 18 from the output signal input from the noise elimination processing means 4. Abnormal sound of the monitoring target device 18 is detected by, for example, abnormal sound detection processing described in Japanese Patent Application Publication No. 2010-271073 or 2008-76246 (an abnormal sound detection step).

As such, it becomes possible to detect abnormal sound under noise environment, so it is possible to improve accuracy in detection of abnormal sound under various environments, as compared to a case where noise elimination processing is performed without using the arrangement of the microphone array 3 as described in the first embodiment.

Also, when an abnormal sound is detected by the abnormal sound detecting means 20, it is possible to prevent the device from operating for a long time in an unstable state by, for example, automatically stopping the monitoring target device 18 or notifying an operator of a malfunction of the device by means of an alarm, mail, or the like.

Fourth Embodiment

The following describes an arrangement of microphones 2 for accurately eliminating noise in a situation where the range in which a target sound source exists and the range in which a noise source exists can move.

Figure 11A:
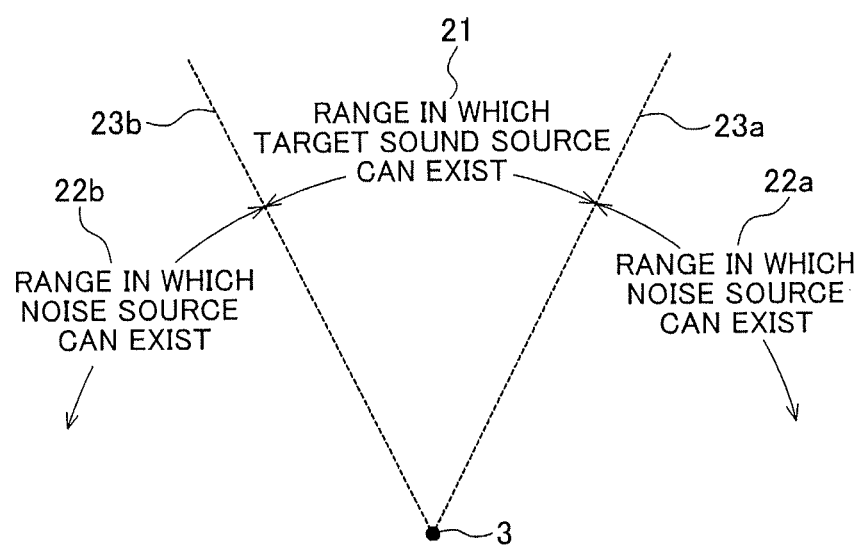
FIGS. 11A and 11B are configuration diagrams of the range in which a target sound source can exist, the range in which a noise source can exist, and an arrangement of microphones 2, in a fourth embodiment of the present invention.
Figure 11B:
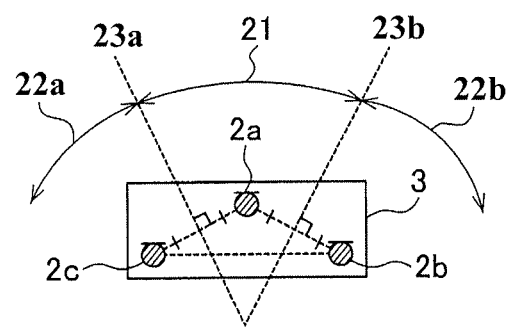

FIGS. 11A and 11B are configuration diagrams of the range in which the target sound source can exist, the range in which the noise source can exist, and an arrangement of the microphones 2, in a fourth embodiment of the present invention.

FIG. 11*a* is an arrangement diagram of the range in which the target sound source can exist, the range in which the noise source can exist, and a microphone array 3. FIG. 11*b* is an arrangement diagram of the microphone array 3, which is constituted by three microphones 2.

It is assumed that as illustrated in FIG. 11*a*, the range in which the target sound source can exist (direction range of the target sound source) 21 is located radially about the microphone array 3 over a certain angular range. The range outside the direction range 21 of the target sound source is assumed to be the range in which the noise source can exist (direction range of the noise source) 22; a boundary between the direction range 21 of the target sound source and a direction range 22*a* of the noise source is referred to as the boundary 23*a*; a boundary between the direction range 21 of the target sound source and a direction range 22*b* of the noise source is referred to as the boundary 23*b*. In this case, multiple target sound sources may exist in the target sound source direction range 21, and multiple noise sources may exist in the noise source direction range 22.

In such a situation, a microphone 2a of the microphone array 3 is arranged on a bisector of an angle formed by the two boundaries 23a and 23b of the target sound source direction range. A microphone 2b adjacent to the microphone 2a is arranged so that a direction of a perpendicular bisector of a line segment connecting the microphones 2a and 2b coincides with the boundary 23a. Further, a microphone 2c adjacent to the microphone 2a is arranged so that a direction of a perpendicular bisector of a line segment connecting the microphones 2a and 2c coincides with the boundary 23b.

The microphone 2a corresponds to a first acoustic sensor, the microphone 2b corresponds to a second acoustic sensor, and the microphone 2c corresponds to a third acoustic sensor.

Arranging the microphones 2b and 2c with the microphone 2a as an apex in this manner results in an arrangement in which the microphone 2a is at a vertex forming a vertex angle of an isosceles triangle, the microphone 2b is arranged at one end of a base opposite the vertex angle of the isosceles triangle, and the microphone 2c is arranged at the other end of the base. It is assumed that the distance between the microphone array 3 and the target sound source or the distance between the microphone array 3 and the noise source is sufficiently greater than the distances between the microphones 2a, 2b, and 2c. Although the microphone array 3 has been described as consisting of the three microphones 2 arranged as described above, it may be configured to include the three microphones arranged as described above.

The noise elimination processing means 4 performs elimination of the noise and enhancement of the target sound on observed signals of sounds observed by the microphone array 3 arranged as described above, and outputs an output signal, as described in the first embodiment. It is also possible to perform noise elimination on the observed signals of the microphone array 3 arranged as above, and cancel echo in the echo cancelling means 16 as described in the second embodiment. It is further possible to perform noise elimination on the observed signals of the microphone array 3 arranged as above, and detect abnormal sound in the abnormal sound detecting means 20.

In this manner, for example, the three microphones 2 are arranged at the respective vertexes of the isosceles triangle, and the microphone 2a, which is arranged at one of the vertexes that forms the vertex angle of the isosceles triangle, is arranged on the bisector of the angle formed by the two boundaries 23a and 23b between the target sound source direction range and the noise source direction range. The microphones 2b and 2c are arranged so that the boundaries between the target sound source direction range and the noise source direction range coincide with the direction of the perpendicular bisector of the line segment connecting the microphone 2a and the microphone 2b, which is arranged at one end of the base of the isosceles triangle, and the direction of the perpendicular bisector of the line segment connecting the microphone 2a and the microphone 2c, which is arranged at the other end of the base of the isosceles triangle. By arranging the microphones 2 in this manner, in a situation in which the target sound is most difficult to clarify, that is, in a case in which the noise source exists on one of the boundaries, where the noise source is closest to the target sound source, the arrival direction of the noise coincides with the direction of the perpendicular bisector of the line segment connecting at least one microphone pair 6, so that the noise elimination performance is maximized.

Thus, unless the noise source enters the target sound source direction range, it is possible to achieve stable noise elimination performance wherever the noise source exists.

INDUSTRIAL APPLICABILITY

As above, the noise eliminating device 1 according to the present invention can accurately estimate the noise arrival direction based on the time difference with the microphones 2 arranged so that the direction of the perpendicular bisector of the line segment connecting at least one microphone pair 6 coincides with the noise source 7, and thus can provide high noise elimination performance.

REFERENCE SIGNS LIST 1 noise eliminating device, 2 microphone, 3 microphone array, 4 noise elimination processing means, 5 speaker, 6 microphone pair, 7 noise source, 8 AD converter, 9 memory, 10 processor, 11 output device, 12 processing circuit, 13 voice receiver, 14 echo cancelling device, 15 speaker, 16 echo cancelling means, 17 voice transmitter, 18 monitoring target device, 19 abnormal sound detecting device, 20 abnormal sound detecting means, 21 target sound source direction range, 22 noise source direction range, 23 boundary between target sound source direction range and noise source direction range.

The invention claimed is:

1. A noise eliminating device comprising:
an acoustic sensor array including three acoustic sensors arranged at vertexes of an isosceles triangle: a first acoustic sensor arranged at one of the vertexes that forms a vertex angle of the isosceles triangle, a second acoustic sensor arranged at one of the vertexes that is one end of a base opposite the vertex angle, and a third acoustic sensor arranged at one of the vertexes that is the other end of the base, wherein
 the first acoustic sensor is arranged on a bisector between two boundaries between a direction range of a target sound source that is a range in which the target sound source is expected to exist and a direction range of a noise source that is a range in which the noise source is expected to exist; and
 the second acoustic sensor and the third acoustic sensor are arranged so that the boundaries coincide with a direction of a perpendicular bisector of a line segment connecting the second acoustic sensor and the first acoustic sensor, and a direction of a perpendicular bisector of a line segment connecting the third acoustic sensor and the first acoustic sensor; and
a noise elimination processor to
receive time-domain observed signals output from the first and second acoustic sensors,
perform short-time discrete Fourier transform on the observed signals to obtain frequency-domain observed signal spectra,
calculate a sound arrival direction for each discrete frequency on a basis of a phase difference between the observed signal spectra,
generate a filter configured to enhance time-frequency components of sound arriving from a direction of a target sound and eliminate other time-frequency components, on a basis of the sound arrival direction for each discrete frequent,
multiply the observed signal spectrum of one of the first and second acoustic sensors by the filter to generate an output signal spectrum, and convert the output signal spectrum to a time-domain output signal through inverse discrete Fourier transform.

2. The noise eliminating device of claim 1, wherein the noise elimination processor calculates the sound arrival direction on a basis of $\arg(X_2(\omega,\tau)/X_1(\omega,\tau))$, where arg denotes an argument of a complex number, $X_1(\omega,\tau)$ denotes the observed signal spectrum of the first acoustic sensor, $X_2(\omega,\tau)$ denotes the observed signal spectrum of the second acoustic sensor, $\omega$ denotes a discrete frequency, and T denotes a short time frame.

3. The noise eliminating device of claim 1, wherein the noise elimination processor calculates the sound arrival direction according to the following equation:

$$\theta(\omega, \tau) = \arcsin\left\{\frac{c}{2\pi\omega d}\arg\left(\frac{X_2(\omega, \tau)}{X_1(\omega, \tau)}\right)\right\}$$

where $\theta(\omega,\tau)$ denotes the sound arrival direction, $\omega$ denotes a discrete frequency; $\tau$ denotes a short time frame, c denotes a sound speed, d denotes a distance between the first and second acoustic sensors, arg denotes an argument of a complex number, $X_1(\omega,\tau)$ denotes the observed signal spectrum of the first acoustic sensor, and $X_2(\omega,\tau)$ denotes the observed signal spectrum of the second acoustic sensor.

4. The noise eliminating device of claim 1, wherein the first and second acoustic sensors are arranged so that a direction of a perpendicular bisector of a line segment connecting the first and second acoustic sensors coincides with a direction from which noise comes.

5. The noise eliminating device of claim 1, wherein
the acoustic sensor array includes three or more acoustic sensors including the first and second acoustic sensors; and
the noise elimination processor generates the filter using averages of sound arrival directions observed by a plurality of pairs each comprising two of the three or more acoustic sensors.

6. The noise eliminating device of claim 1, wherein
the target sound is operating sound of a device to be monitored; and
the noise eliminating device further comprises an abnormal sound detector to detect abnormal sound from the device to be monitored, on a basis of the output signal output from the noise elimination processor.

* * * * *